(12) United States Patent
Yamasaki

(10) Patent No.: US 9,201,570 B2
(45) Date of Patent: Dec. 1, 2015

(54) SYNCHRONOUS CONTROL SYSTEM INCLUDING A MASTER DEVICE AND A SLAVE DEVICE, AND SYNCHRONOUS CONTROL METHOD FOR CONTROLLING THE SAME

(75) Inventor: Akihiro Yamasaki, Kobe (JP)

(73) Assignee: GVBB Holdings S.A.R.L., Luxembourg (LU)

( * ) Notice: Subject to any disclaimer, the term of this patent is extended or adjusted under 35 U.S.C. 154(b) by 190 days.

(21) Appl. No.: 13/391,023

(22) PCT Filed: Aug. 21, 2009

(86) PCT No.: PCT/JP2009/004011
§ 371 (c)(1),
(2), (4) Date: May 8, 2012

(87) PCT Pub. No.: WO2011/021251
PCT Pub. Date: Feb. 24, 2011

(65) Prior Publication Data
US 2012/0218293 A1  Aug. 30, 2012

(51) Int. Cl.
*G06F 3/0484* (2013.01)
*G06F 3/0483* (2013.01)

(52) U.S. Cl.
CPC .......... *G06F 3/0483* (2013.01); *G06F 3/04847* (2013.01); *G06F 3/0484* (2013.01)

(58) Field of Classification Search
CPC ....... G09G 5/00; G06F 3/0481; G06F 9/4443; G06F 9/4446; G06F 2203/04804; G06F 3/04855; G06F 3/04817; G06F 3/04883; G06F 3/017; G06F 3/0482; G06F 3/04847; G06F 3/00

USPC ................. 345/419, 619, 339, 348, 358, 629; 715/700–866, 974
See application file for complete search history.

(56) References Cited

U.S. PATENT DOCUMENTS

| 5,559,301 A | 9/1996 | Bryan et al. |
| 5,581,670 A | 12/1996 | Bier |

(Continued)

FOREIGN PATENT DOCUMENTS

| EP | 0533424 A | 3/1993 |
| EP | 1939716 | 7/2008 |

(Continued)

OTHER PUBLICATIONS

Wiretotheear, KikAXXE software synthesizer from Way Out Ware, Jan. 6, 2008, http://www.youtube.com/watch?v=sTn_bAsuYc, pp. 1.*

(Continued)

*Primary Examiner* — Stephen R Koziol
*Assistant Examiner* — Brian Kravitz
(74) *Attorney, Agent, or Firm* — Arent Fox LLP

(57) ABSTRACT

A parameter adjusting method includes a step (S1) of determining whether or not a predetermined manipulation of an icon with a pointer occurs on a screen; a step (S2) of displaying an auxiliary indicator used for adjustment of a predetermined parameter in the vicinity of the icon on the screen in the case where it is determined that the predetermined manipulation of the icon with the pointer occurs; and a step (S3, S4) of adjusting the parameter by manipulating the auxiliary indicator by manipulation of the pointer.

20 Claims, 12 Drawing Sheets

(56) References Cited

U.S. PATENT DOCUMENTS

| | | | |
|---|---|---|---|
| 5,640,176 A * | 6/1997 | Mundt et al. | 715/839 |
| 5,790,820 A | 8/1998 | Vayda | |
| 5,815,154 A * | 9/1998 | Hirschtick et al. | 715/853 |
| 6,229,456 B1 * | 5/2001 | Engholm et al. | 341/35 |
| 6,369,837 B1 | 4/2002 | Schirmer | |
| 7,046,230 B2 | 5/2006 | Zadesky | |
| 7,684,605 B2 * | 3/2010 | Klingenbeck-Regn | 382/132 |
| 7,720,552 B1 * | 5/2010 | Lloyd | 700/10 |
| 8,225,207 B1 * | 7/2012 | Ramirez | 715/716 |
| 2003/0193474 A1 * | 10/2003 | Yamamoto | 345/156 |
| 2005/0028107 A1 * | 2/2005 | Gomes et al. | 715/762 |
| 2006/0236248 A1 * | 10/2006 | Eischeid et al. | 715/751 |
| 2006/0241837 A1 * | 10/2006 | Jarrett et al. | 701/50 |
| 2006/0279541 A1 | 12/2006 | Kim | |
| 2007/0208718 A1 * | 9/2007 | Javid et al. | 707/3 |
| 2007/0209002 A1 * | 9/2007 | Terada et al. | 715/705 |
| 2007/0245238 A1 * | 10/2007 | Fugitt et al. | 715/700 |
| 2009/0187860 A1 * | 7/2009 | Fleck et al. | 715/834 |
| 2010/0123737 A1 * | 5/2010 | Williamson et al. | 345/672 |
| 2010/0153833 A1 * | 6/2010 | Siegel et al. | 715/205 |
| 2010/0185985 A1 * | 7/2010 | Chmielewski et al. | 715/834 |
| 2010/0281404 A1 * | 11/2010 | Langmacher et al. | 715/762 |
| 2010/0306702 A1 * | 12/2010 | Warner | 715/811 |

FOREIGN PATENT DOCUMENTS

| | | |
|---|---|---|
| JP | 08263248 | 10/1996 |
| JP | 2001-290575 A | 10/2001 |
| JP | 2006-42170 A | 2/2006 |
| WO | 2006056243 A | 6/2006 |
| WO | WO-2008/126130 | 10/2008 |
| WO | 2011021251 A1 | 2/2011 |

OTHER PUBLICATIONS

Telerik, TooTip/Load on Demand, Mar. 25, 2009, https://web.archiye.org/web/20090325081637/http://demos.telerik.com/aspnet-ajax/ToolTip/Examples/LoadOnDemand/DefaultCS.aspx, pp. 1.*

International Search Report for International Application No. PCT/JP2009/004011, mailed Jul. 22, 2010, 3 pages.

European Search Opinion dated May 9, 2007 regarding EP06465019.5.

European Search Report dated May 9, 2007 regarding EP06465019.5.

International Preliminary Report on Patentability dated Feb. 22, 2012, and Written Opinion dated Jul. 22, 2010 regarding PCT/JP2009/004011.

Notice of Reasons for Rejection dated Sep. 24, 2013 regarding Japanese Patent Application No. JPA 2012-508276.

* cited by examiner

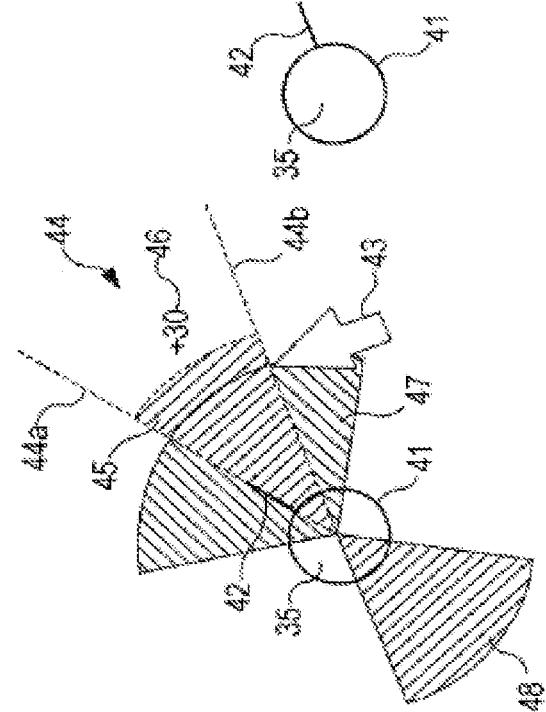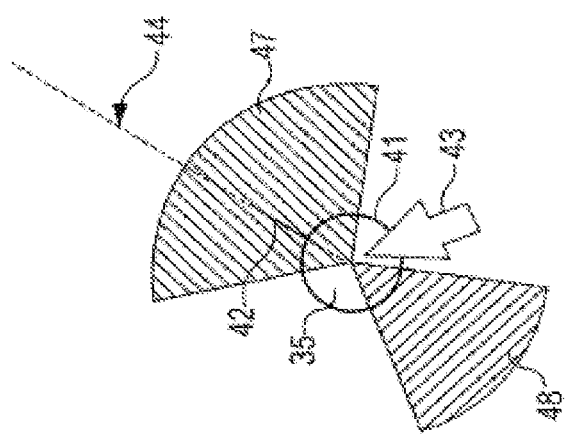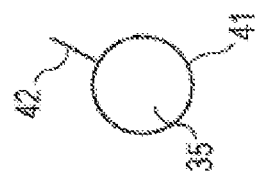
FIG. 7A  FIG. 7B  FIG. 7C  FIG. 7D

SYNCHRONOUS CONTROL SYSTEM INCLUDING A MASTER DEVICE AND A SLAVE DEVICE, AND SYNCHRONOUS CONTROL METHOD FOR CONTROLLING THE SAME

CROSS-REFERENCE TO RELATED APPLICATION

This application is a United States National Stage Application under 35 U.S.C. §371 of International Patent Application No. PCT/JP2009/004011, filed Aug. 21, 2009, which is incorporated by reference into this application as if fully set forth herein.

TECHNICAL FIELD

The present invention relates to a method, an apparatus and a program for adjusting a parameter on a user interface screen.

BACKGROUND ART

A nonlinear video editing system uses color, motion and other effect functions to provide a video image with various kinds of special effects. The effect function involves a plurality of parameters to determine the level of the effect. The user can adjust the parameters by manipulating icons displayed on the user interface screen with a mouse pointer.

FIG. 12 shows a conventional user interface screen 100. The user manipulates various kinds of icons displayed on the user interface screen 100 with a mouse pointer to finely adjust the parameters.

According to another conventional technique, for example, in order to improve the ease of visual recognition and selection of icons displayed on the user interface screen, each icon displayed is enlarged when the mouse pointer comes close to the icon (see the Patent Literature 1).

CITATION LIST

Patent Literature

[PTL 1] Japanese Patent Laid-Open No. 8-263248

SUMMARY OF INVENTION

Technical Problem

As the number of parameters to adjust the effect function increases, the number of icons to be displayed on the user interface screen increases. In order that the various kinds of parameters can be adjusted on one user interface screen despite even if the number of icons increases, the increased number of icons are preferably displayed in one window region. However, the size of the window region on the user interface screen is limited. Therefore, in order to display the increased number of icons in one window region, the size of each icon displayed has to be reduced, and thus, a problem that the ease of visual recognition decreases arises.

In addition, as each icon displayed becomes smaller, the relative variation of the parameter with respect to the movement of the mouse pointer increases. That is, even a slight movement of the mouse pointer can lead to a great variation of the parameter. Therefore, when the icon displayed is small, it is difficult to finely adjust the parameter through manipulation of the mouse pointer.

The method disclosed in the Patent Literature 1 in which the icons displayed are enlarged has a problem that, although the ease or visual recognition of the enlarged icon can be improved, the ease of visual recognition of the other icons covered by the enlarged icons is compromised.

In view of such circumstances, an object of the present invention is to provide a method, an apparatus and a program for adjusting a parameter on a user interface screen, which can solve the problems described above.

Solution to Problem

A parameter adjusting method according to a first aspect of the present invention comprises: a step of determining whether or not, on a screen displaying a pointer manipulated according to a manipulation by a user and an icon manipulated with the pointer to adjust a predetermined parameter, a predetermined manipulation of the icon with the pointer occurs; a step of displaying an auxiliary indicator used for adjustment of the predetermined parameter in the vicinity of the icon on the screen in the case where it is determined that the predetermined manipulation of the icon with the pointer occurs in the determining step; and a step of adjusting the parameter by manipulating the auxiliary indicator by manipulation of the pointer.

BRIEF DESCRIPTION OF DRAWINGS

FIGS. 7A, 7B, 7C, and 7D show examples of the auxiliary indicator displayed in the method illustrated in FIG. 6;

DESCRIPTION OF EMBODIMENTS

In the following, specific embodiments of the present invention will be described in detail with reference to the drawings.

First Embodiment

With reference to FIGS. 1 to 5A-D, a parameter adjusting apparatus according to a first embodiment of the present invention will be described.

<Hardware Configuration>

Figure 1:
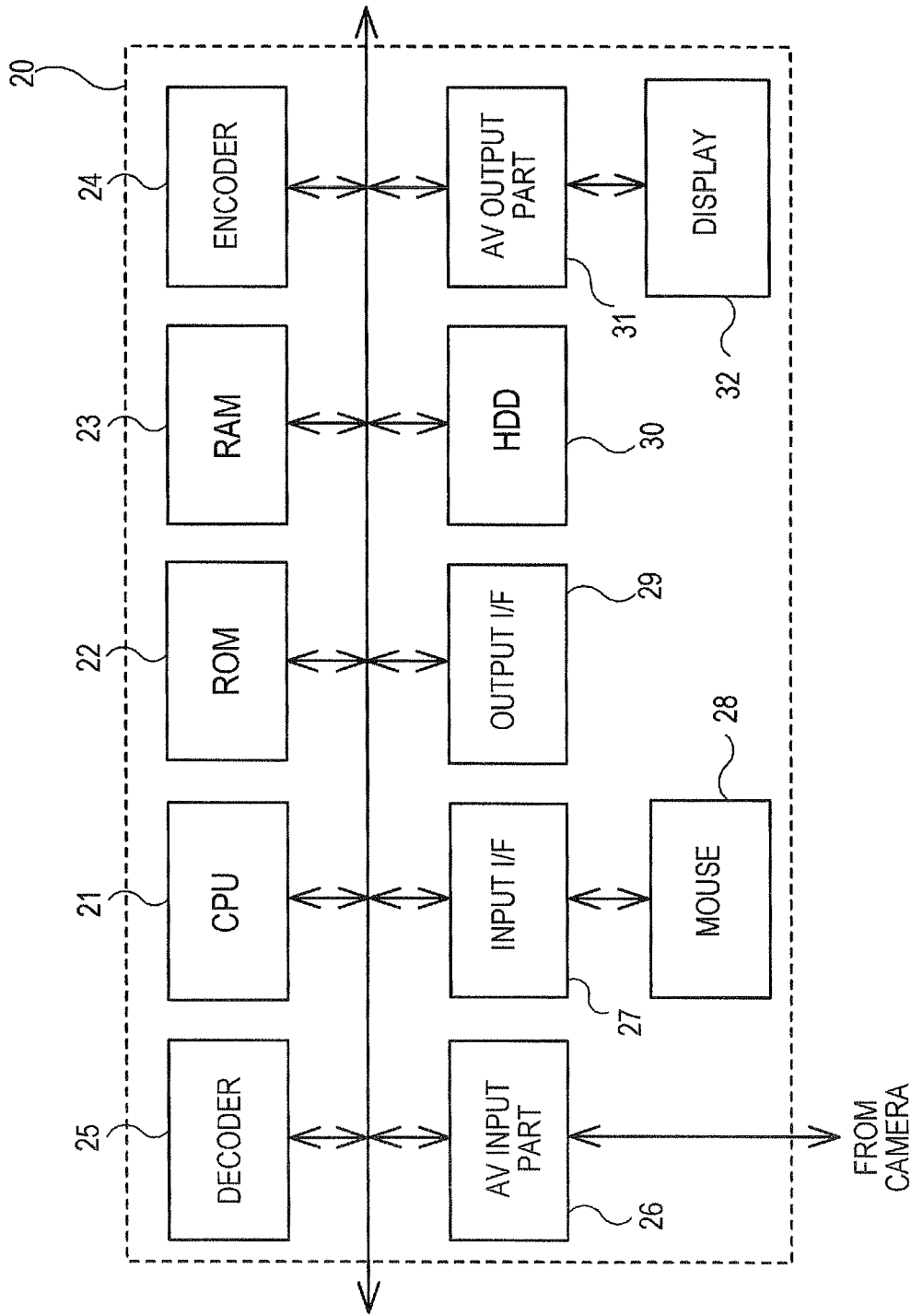
FIG. 1 is a diagram showing a hardware configuration of a nonlinear editing apparatus including a parameter adjusting apparatus according to an embodiment of the present invention.

FIG. 1 is a diagram showing a hardware configuration of a nonlinear editing apparatus 20 including the parameter adjusting apparatus according to this embodiment of the present invention.

The nonlinear editing apparatus 20 comprises a central processing unit (CPU) 21, a read-only memory (ROM) 22, a random access memory (RAM) 23, an encoder 24, a decoder 25, an AV input part 26, an input interface (I/F) 27, a mouse 28, an output interface (I/F) 29, a hard disk drive (HDD) 30, an AV output part 31, and a display 32. The nonlinear editing apparatus 20 receives video data at the AV input part 26, transfers the video data to the display 32 via the AV output part 31 to display the video data on the display 32, and edits the video data in response to an instruction input by a user manipulating a control device such as the mouse 28.

The CPU 21 controls the whole of the nonlinear editing apparatus 20 according to a program stored in the ROM 22 described later. The ROM 22 also stores a program to implement a parameter adjusting method according to an embodiment of the present invention. The RAM 23 temporarily stores information about a latest parameter processed by the CPU 21 and the video data.

The encoder 24 encodes and compresses the video data edited by the CPU 21. The video data compressed by the encoder 24 is stored in the HDD 30. Although this embodiment is described on the assumption that the HDD 30 stores the compressed video data, the present invention is not limited to thereto, and any other storage device suitable for storing the compressed data, such as digital versatile disk random access memory (DVD-RAM), can be used depending on the implementation.

The decoder 25 decodes the compressed data input from the AV input part 26 or the compressed data stored in the HDD 30. The video data decoded by the decoder 25 is temporarily stored in the RAM 23 and then output to the display 32 via the AV output part 31.

The AV input part 26 has a function of capturing video data transmitted from another apparatus. The AV input part 26 can be an interface, such as IEEE1394, USB, Bluetooth™, Wireless USB, infrared and wireless LAN (IEEE802.11 series).

The input I/F 27 is an interface having a function to connect to a controlling device, such as the mouse 28, a keyboard and a joystick (not shown). A manipulation signal from the controlling device, such as the mouse 28, is input to the CPU 21 via the input I/F 27.

The mouse 28 is a control device for receiving a user input. In this embodiment, the mouse 28 is used to control the operation of a mouse pointer displayed on the display 32 in response to a manipulation by the user.

The output I/F 29 is an interface having a communication function to connect to a printer, another computer or other devices not shown. The output I/F 29 can be constituted by a USB connector slot, a Bluetooth™ port, a Wireless USB port, an infrared port or a wireless LAN port (IEEE802.11 series), for example.

The HDD 30 serves as a storage device and stores data or a program required to implement the parameter adjusting method according to this embodiment of the present invention or information about various kinds of parameters including a recommended range 47 and a non-recommended range 48 described later with regard to a second embodiment. In addition, the HDD 30 stores video data input from the AV input part 26 and the like.

The AV output part 31 is an interface having a communication function to connect to the display 32. Video data edited by the CPU 21 and video data involved with an auxiliary indicator displayed in the parameter adjusting method described later are transmitted to the display 32 via the AV output part 31.

The display 32 can be a color thin film transistor (TFT) liquid crystal display or a super twisted nematic (STN) liquid crystal display, for example. The display 32 displays a preview image of data being edited or an edited video stored in the HDD 30. In addition, the CPU 21 displays an edit window (denoted by reference numeral 40 in FIG. 3, for example) or an auxiliary indicator (denoted by reference numeral 44 in FIG. 3, for example) described later on the display 32, for example.

<Functional Configuration of Parameter Adjusting Apparatus>

Figure 2:
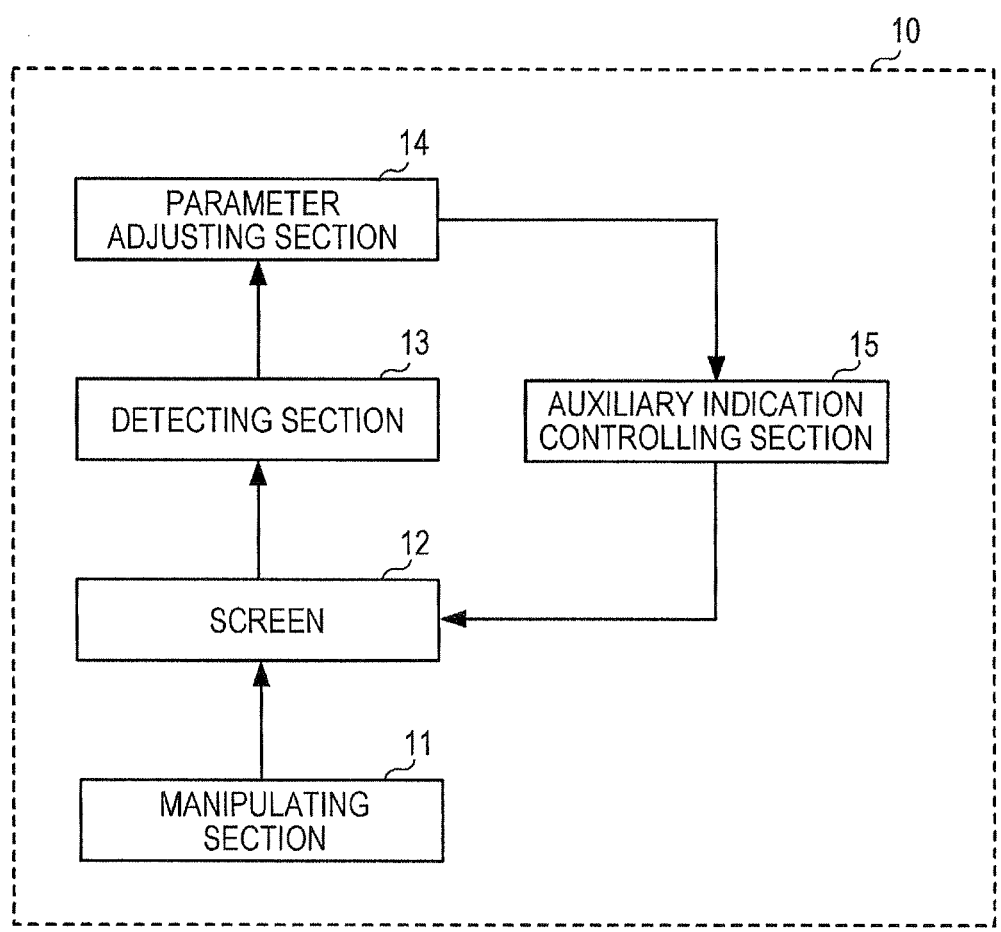
FIG. 2 is a diagram showing a functional configuration of the parameter adjusting apparatus included in the nonlinear editing apparatus shown in FIG. 1.

FIG. 2 is a diagram showing a functional configuration of a parameter adjusting apparatus 10. With reference to FIGS. 1 and 2, the parameter adjusting apparatus 10 according to this embodiment of the present invention included in the nonlinear editing apparatus 20 will be described.

The parameter adjusting apparatus 10 according to this embodiment of the present invention comprises a manipulating section 11, a screen 12, a detecting section 13, a parameter adjusting section 14 and an auxiliary indication controlling section 15. In this embodiment, a control device, such as the mouse 28, a keyboard and a joystick, constitutes the manipulating section 11, the display 32 constitutes the screen 12, and the CPU 21 in cooperation with a program constitutes the detecting section 13, the parameter adjusting section 14 and the auxiliary indication controlling section 15. The CPU 21 constitutes these sections to provide (1) an auxiliary indication function and (2) a parameter adjustment function. In the following, each of the functions of the parameter adjusting apparatus 10 will be described.

(1) Auxiliary Indication Function

On the screen 12 displaying a pointer (denoted by reference numeral 43 in FIG. 3, for example) that moves in response to a manipulation of the manipulating section 11 by the user and an icon 35 to be manipulated with the pointer to adjust a parameter, the detecting section 13 detects a predetermined manipulation of the icon 35 by the pointer. Then, in response to the manipulation of the icon 35 by the pointer detected by the detecting section 13, the auxiliary indication controlling section 15 displays an auxiliary indicator (denoted by reference numeral 44 in FIG. 3, for example) to aid in parameter adjustment with the icon 35 on the screen 12 by overlaying the auxiliary indicator on other displayed contents.

(2) Parameter Adjustment Function

In response to the manipulation of the pointer (denoted by reference numeral 43 in FIG. 3, for example) detected by the detecting section 13, the parameter adjusting section 14 adjusts a parameter associated with the icon 35 manipulated by the pointer. The auxiliary indication controlling section 15 modifies the auxiliary indicator in response to the adjustment of the parameter by the parameter adjusting section 14.

<Example of Auxiliary Indicator>

Figure 3:
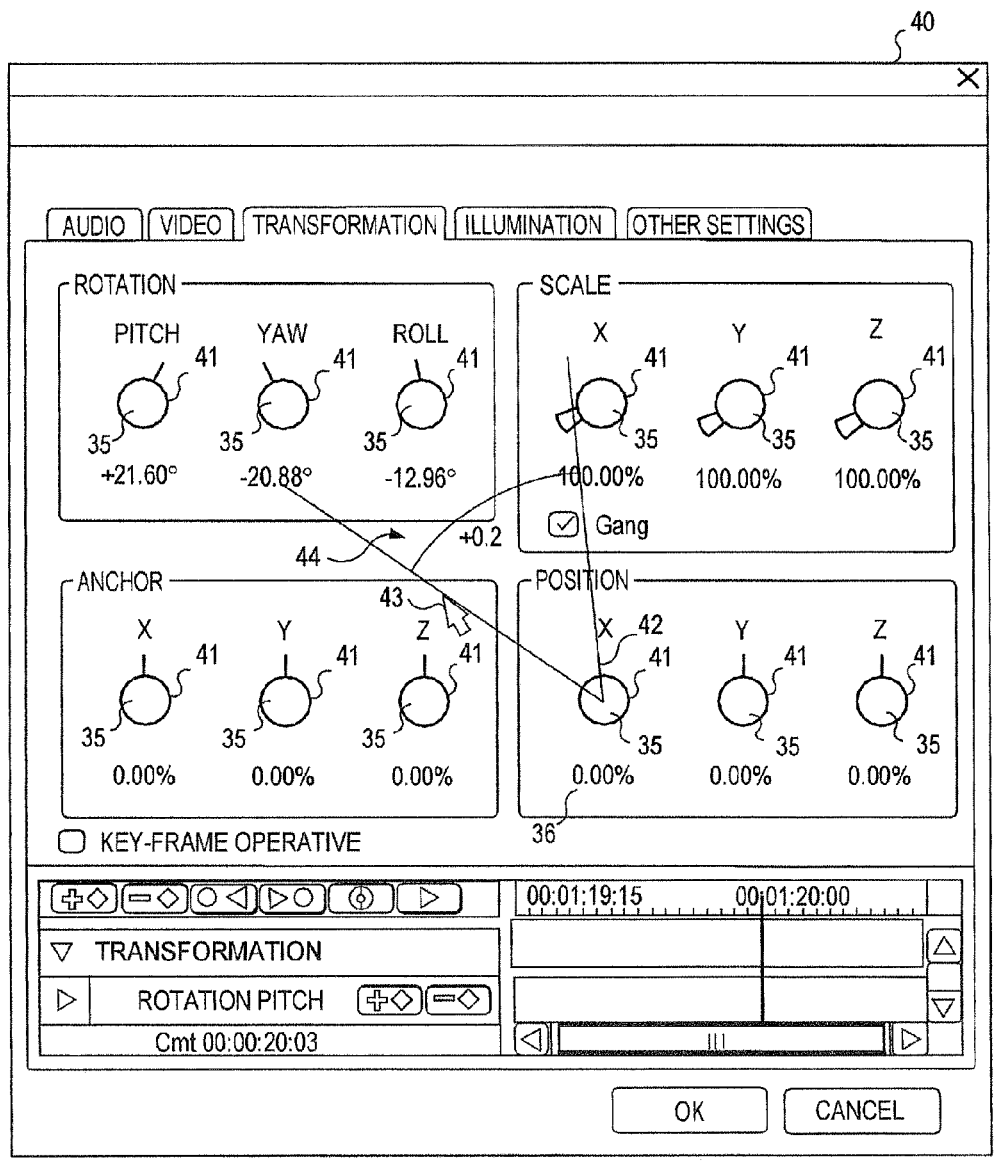
FIG. 3 shows an example of an edit window and an auxiliary indicator displayed by the parameter adjusting apparatus shown in FIG. 2.

FIG. 3 shows an example of the edit window and the auxiliary indicator displayed on the display 32 for nonlinear editing. The CPU 21 displays an edit window 40 on the display 32 when the user manipulates the control device to start a nonlinear edit mode.

The edit window 40 shows a plurality of tabs opened depending on the content of the nonlinear edition, a plurality of manipulation groups that can be manipulated in the tab opened, a plurality of button-like icons 35 indicating items that can be edited in each of the manipulation groups, and the mouse pointer 43 that moves in response to a manipulation of the mouse 28 by the user.

The tabs include an "audio" tab, a "visual" tab, a "transformation" tab, an "illumination" tab and an "other settings" tab. Manipulation groups in the "transformation" tab include a "rotation" manipulation group, a "scale" manipulation group, an "anchor" manipulation group and a "position" manipulation group. Icons in the "rotation" manipulation group include a "pitch" icon, a "yaw" icon and a "roll" icon. Icons in the "scale", "anchor" and "position" manipulation groups each include an "X" icon, a "Y" icon and a "Z" icon.

Each icon 35 has a detection area 41. The detection area 41 is an area around the icon 35 entry of the mouse pointer 43 into which is detected. In order that the user manipulating the mouse 28 can visually recognize the detection area 41, the detection area 41 is preferably substantially the same as the display area of the icon 35. Current numerical information about the parameter associated with each icon 35 is indicated by the inclination of a marker 42 attached to the icon 35 and a numeric value 36 shown below the icon 35.

When entry of the mouse pointer 43 into the detection area 41 of any icon 35 and a click manipulation in the detection area 41 are detected, the CPU 21 serving as the auxiliary indication controlling section 15 displays the auxiliary indicator 44 used for adjusting the parameter associated with the icon 35 in the edit window 40 by overlaying the auxiliary indicator 44 on the other displayed contents. The auxiliary indicator 44 is translucent enough that the underlying information in the edit window 40, such as the other icons 35 and the numeric values 36 shown behind the auxiliary indicator 44, can be seen. Therefore, the visibility of the other information shown behind the auxiliary indicator 44 is not compromised.

The CPU 21 serving as the parameter adjusting section 14 adjusts the parameter associated with the relevant icon 35 in response to a drag manipulation of the mouse pointer 43 detected by the detecting section 13. In response to the adjustment of the parameter by the parameter adjusting section 14, the CPU 21 serving as the auxiliary indication controlling section 15 expands the displayed auxiliary indicator 44 into the shape of a sector with a fixed radius centered on the relevant icon 35, for example. If the drag manipulation is released in the detection area 41 of the icon 35, the auxiliary indicator 44 is hidden.

<Parameter Adjusting Method>

Figure 4:
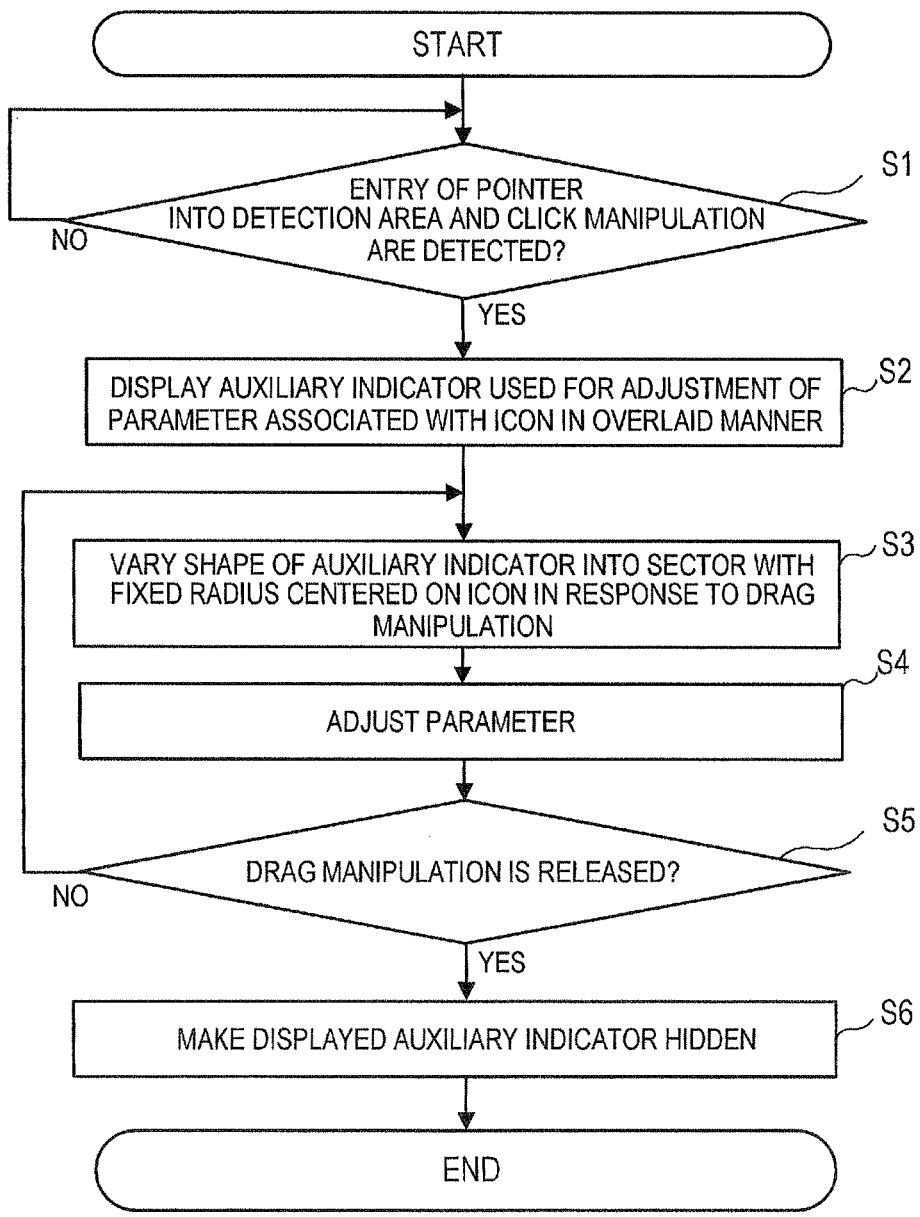
FIG. 4 is a flowchart for illustrating a parameter adjusting method according to the first embodiment of the present invention.

FIG. 4 is a flowchart for illustrating the parameter adjusting method according to the first embodiment of the present invention. FIGS. 5A, 5B, 5C, and 5D show examples of the auxiliary indicator displayed in the parameter adjusting method according to the first embodiment. Note that FIGS. 5A, 5B, 5C, and 5D show only one of the plurality of icons 35 in FIG. 3 in an enlarged manner. With reference to FIGS. 4 and 5A-D, the parameter adjusting method according to the first embodiment will be described.

Figure 5A:
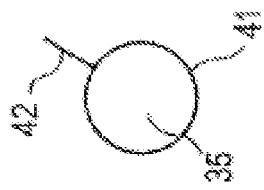
FIGS. 5A, 5B, 5C, and 5D show examples of the auxiliary indicator displayed in the method illustrated in FIG. 4.
Figure 5B:
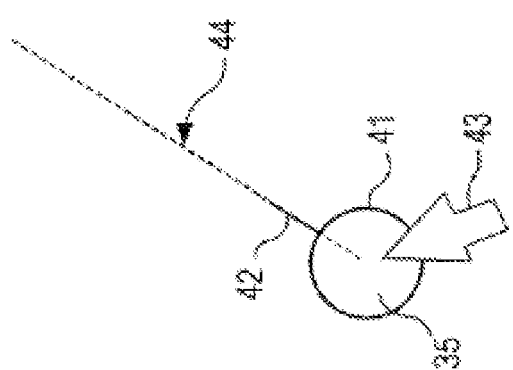

As shown in FIGS. 5A and 5B until the mouse pointer 43 enters the area of the icon 35, and a click manipulation occurs in the detection area 41 of the icon 35, the auxiliary indicator 44 is not displayed in the vicinity of the icon 35, but the icon 35 and the marker 42 indicating the current value of the parameter associated with the icon 35 are displayed.

The CPU 21 determines whether or not entry of the mouse pointer 43 into the detection area 41 of any of the plurality of icons 35 in response to a manipulation of the mouse 28 by the user and occurrence of a click manipulation are detected (step S1). More specifically, through the input I/F 27, the CPU 21 determines whether or not a click manipulation of the mouse pointer 43 in the detection area 41 of any icon 35 occurs.

If the CPU 21 determines that no click manipulation of the mouse pointer 43 is detected in the detection area 41 of any icon 35, the CPU 21 stays in step S1 and waits until entry of the mouse pointer 43 into the detection area 41 of any icon 35 and occurrence of a click manipulation are detected.

On the other hand, if the CPU 21 determines that entry of the mouse pointer 43 into any detection area 41 in response to a manipulation of the mouse 28 by the user and occurrence of a click manipulation are detected, the auxiliary indicator that indicates the current value of the parameter associated with the icon 35 is displayed (step S2). More specifically, the CPU 21 identifies the icon 35 clicked with the mouse pointer 43 through the input I/F 27 and displays the auxiliary indicator 44 shown in FIG. 5B on the screen in an overlaid manner (overlay display). The auxiliary indicator 44 is displayed as an extension of the marker 42 of the icon 35 and is translucent enough that the information behind the auxiliary indicator in the edit window 40 can be seen.

Figure 5C:
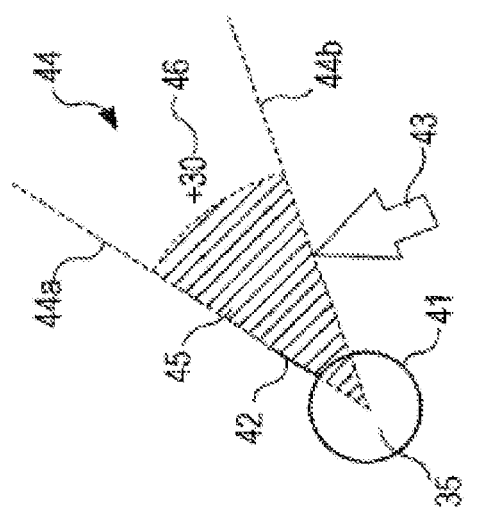

Then, in response to a drag manipulation of the mouse pointer 43 with the mouse 28, the CPU 21 alters the shape of the auxiliary indicator 44 into the shape of a sector with a fixed radius centered on the detection area 41, as shown in FIG. 5C (step S3). More specifically, when the CPU 21 detects a drag manipulation through the input I/F 27, in addition to a line 44 a of the auxiliary indicator that has been displayed as an extension of the marker 42 of the icon 35 since before the drag manipulation of the mouse pointer 43, a line 44 b that connects the tip of the mouse pointer 43 detected through the input I/F 27 and the center of the icon 35 and an auxiliary indicator area 45 in the shape of a sector with a fixed radius formed between the line 44 a and the line 44 b are displayed. The auxiliary indicator area 45 is also displayed on the screen in an overlaid manner (overlay display).

The CPU 21 adjusts the parameter (step S4). In this step, the increment or decrement of the parameter is calculated based on the angle between the reference line 44 a of the auxiliary indicator 44 extending from the marker 42 of the icon 35 and the line 44 b connecting the tip of the mouse pointer 43 moved by the drag manipulation and the center of the icon 35. Then, the CPU 21 adjusts the parameter by adding or subtracting the increment or decrement of the parameter corresponding to the measured angle to or from the current value of the parameter as the increment or decrement of the parameter associated with the icon 35.

In addition, the CPU 21 displays a variation 46 corresponding to the above-described angle in the vicinity of the auxiliary indicator area 45. In the example shown in FIG. 5C, the variation 46 indicates a value of +30. This means that the increment of the parameter compared with the value indicated by the marker 42 of the icon 35 before adjustment is +30.

Then, the CPU 21 determines whether or not the drag manipulation of the mouse pointer 43 is released (step S5). More specifically, through the input I/F 27, the CPU 21 determines whether or not the drag manipulation of the mouse pointer 43 is released.

Figure 5D:
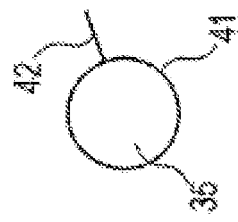

If the CPU 21 determines that the drag manipulation of the mouse pointer 43 is not released, the process returns to step S3, and the procedure from step S3 to step S5 is repeated until the drag manipulation around the icon 35 is released. On the other hand, if the CPU 21 detects that the drag manipulation of the mouse pointer 43 is released, the CPU 21 makes the displayed auxiliary indicator 44 hidden as shown in FIG. 5D (step S6). The parameter adjusting method ends with the completion of this step.

Although the step S4 of adjusting the parameter is performed after the step S3 of altering the auxiliary indicator in this embodiment described above, the present invention is not limited thereto. The step of altering the auxiliary indicator and the step of adjusting the parameter can be performed substantially simultaneously. Alternatively, the step of adjusting the parameter may be performed before the step of altering the auxiliary indicator. Furthermore, although the auxiliary indicator 44 is displayed when entry of the mouse pointer 43 into the detection area 41 of the icon 35 and occurrence of a click manipulation in the detection area 41 are detected in this embodiment described above, the present invention is not limited thereto. For example, the auxiliary indicator 44 may be displayed when entry of the mouse pointer 43 into the detection area 41 of the icon 35 is detected.

According to this embodiment, since the auxiliary indicator 44 used for parameter adjustment is displayed in an overlaid manner on the user interface screen by a manipulation of the manipulating section as required, the user operability of the parameter adjustment is not compromised even if the each icon displayed is small. Therefore, even if the size of the user interface screen is limited, a large number of icons 35 can be displayed on one user interface screen to allow adjustment of a large number of parameters. Furthermore, using the auxiliary indicator 44 for parameter adjustment leads to a reduction of the relative variation of the parameter with respect to the movement of the mouse pointer. As a result, the user can easily finely adjust the parameter by manipulating the mouse. Therefore, even if a plurality of icons 35 are displayed on the user interface screen, the user operability of the parameter associated with each icon 35 is not compromised.

Second Embodiment

With reference to FIGS. 6 and 7A-D, a parameter adjusting method according to a second embodiment of the present invention will be described. The parameter adjusting method according to the second embodiment can be implemented with the same hardware configuration as that of the parameter adjusting apparatus 10 according to the first embodiment. However, the parameter adjusting method according to the second embodiment differs from the parameter adjusting method according to the first embodiment in that a recommended range and a non-recommended range of a parameter associated with an icon 35 are displayed after step S2.

Figure 6:
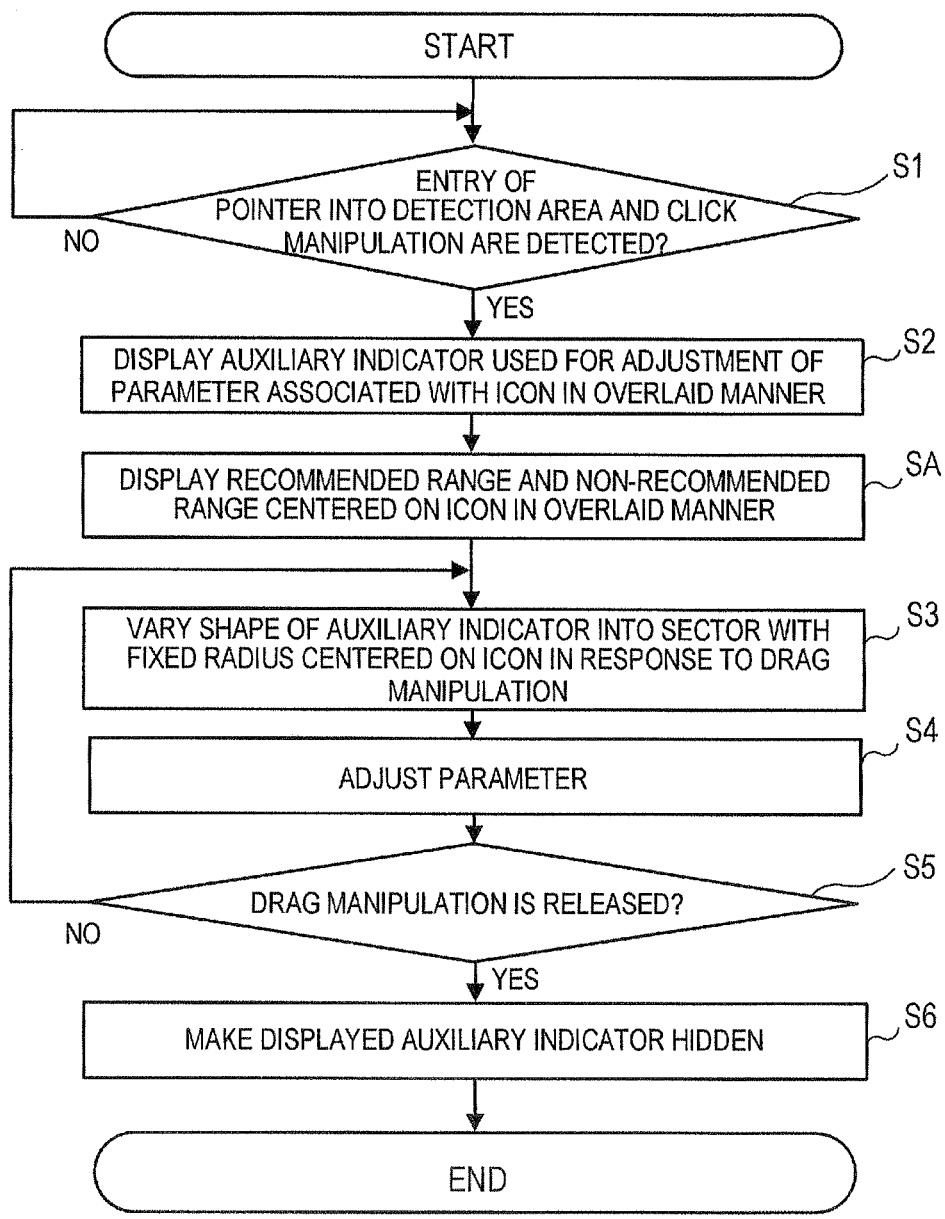
FIG. 6 is a flowchart for illustrating a parameter adjusting method according to a second embodiment of the present invention.

<Parameter Adjusting Method>
FIG. 6 is a flowchart for illustrating the parameter adjusting method according to the second embodiment of the present invention. FIGS. 7A, 7B, 7C, and 7D show examples of the auxiliary indicator displayed in the parameter adjusting method according to the second embodiment. Note that FIGS. 7A, 7B, 7C, and 7D show only one of the plurality of icons 35 in FIG. 3 in an enlarged manner. With reference to FIGS. 6 and 7A-D, the parameter adjusting method according to the second embodiment will be described. Processings in steps S1 and S2 and step S3 and the following steps are the same as those in the first embodiment, and thus, those steps are denoted by the same step numbers as those in FIG. 4, and descriptions thereof will be omitted.

After step S2, the CPU 21 displays a recommended range 47 and a non-recommended range 48 centered on the icon 35 on the screen in an overlaid manner, as shown in FIG. 7B (step SA). More specifically, the CPU 21 reads the recommended range and the non-recommended range for the value of the parameter associated with the relevant icon 35 from the RAM 23 or the HDD 30, and displays the recommended range 47 and the non-recommended range 48 with reference to the definition area 41 of the relevant icon 35 in an overlaid manner based on the read values of the recommended range and the non-recommended range. The recommended range refers to a range of recommended values of the parameter associated with the relevant icon 35. For example, in the case where the parameter is the illuminance, the CPU 21 displays a range of illuminance optimal for displaying an image with reference to the marker 42 of the relevant icon 35 as the recommended range 47.

The non-recommended range refers to a range of values of the parameter associated with the relevant icon 35 that are considered inappropriate. For example, in the case where the parameter is the illuminance, the CPU 21 displays a range of values that are not preferable for displaying an image with reference to the marker 42 of the relevant icon 35 as the non-recommended range 48. The recommended range 47 and the non-recommended range 48 are displayed in the shape of a sector centered on the center of the icon 35.

When the processing in step SA is ended, as in the first embodiment, the CPU 21 performs the processings in step S3 and the following steps. Then, if the CPU 21 detects that the drag manipulation of the mouse pointer 43 is released in step S5, the CPU 21 makes the displayed auxiliary indicator 44 hidden as shown in FIG. 7D and makes the displayed recommended range 47 and non-recommended range 48 hidden (step S6). The parameter adjusting method ends with the completion of this step.

Although the recommended range and the non-recommended range are displayed as the auxiliary indicator in the embodiment described above, the present invention is not limited thereto, and one of the recommended range and the non-recommended range may be displayed as the auxiliary indicator.

Third Embodiment

With reference to FIGS. 8 and 9A-E, a parameter adjusting method according to a third embodiment of the present invention will be described. The parameter adjusting method according to the third embodiment can be implemented with the same hardware configuration as that of the parameter adjusting apparatus 10 according to the first embodiment. However, the parameter adjusting method according to the third embodiment differs from the parameter adjusting method according to the first embodiment in that a processing of step SB is performed after step S3 in the first embodiment. That is, the third embodiment differs from the first embodiment in that the auxiliary indicator indicating the increase or decrease of the value of the parameter to be adjusted is not in the shape of a sector with a fixed radius but in the shape of a sector with a varying radius.

Figure 8:
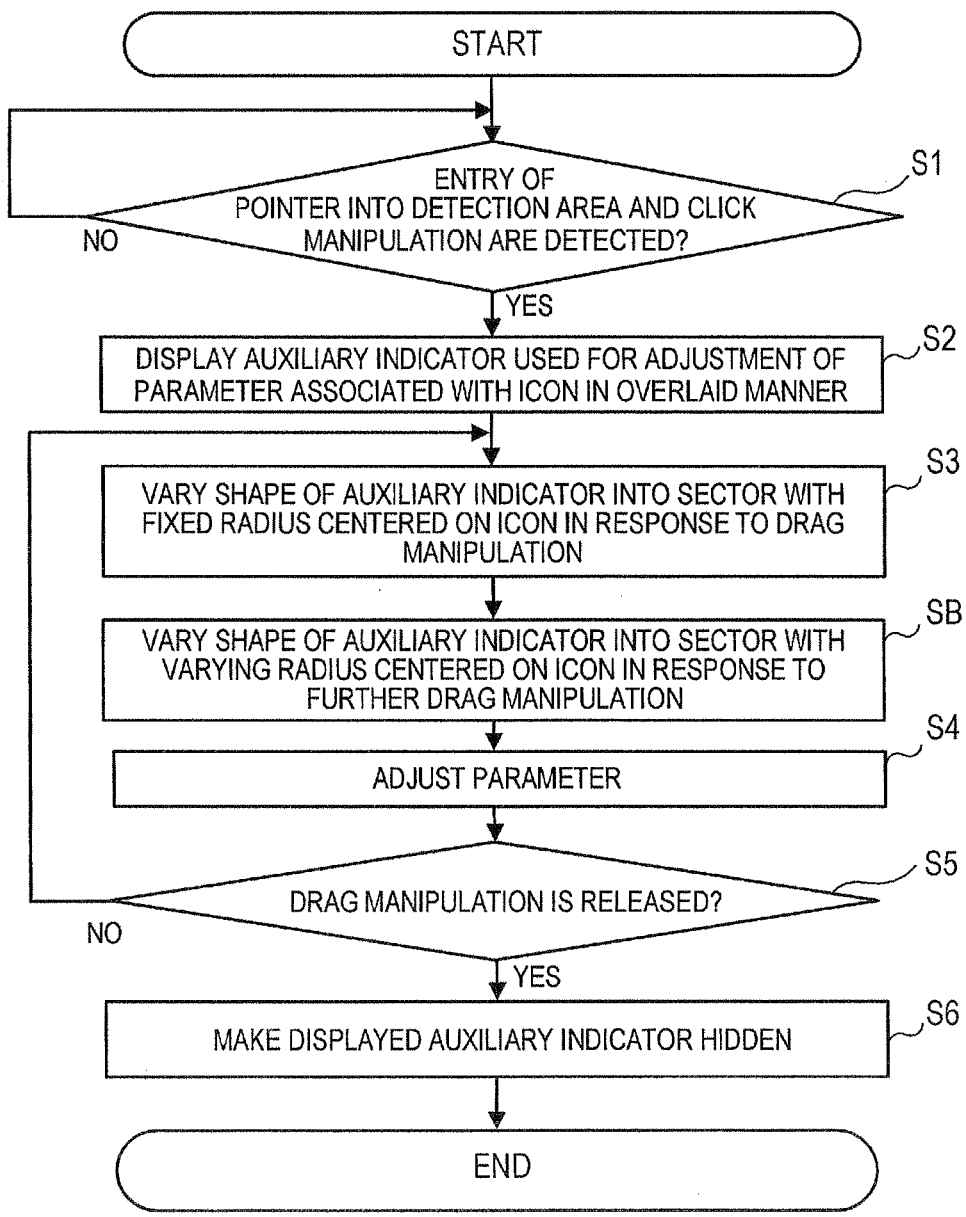
FIG. 8 is a flowchart for illustrating a parameter adjusting method according to a third embodiment of the present invention.
Figures 9A, 9B, 9C, 9D, 9E:
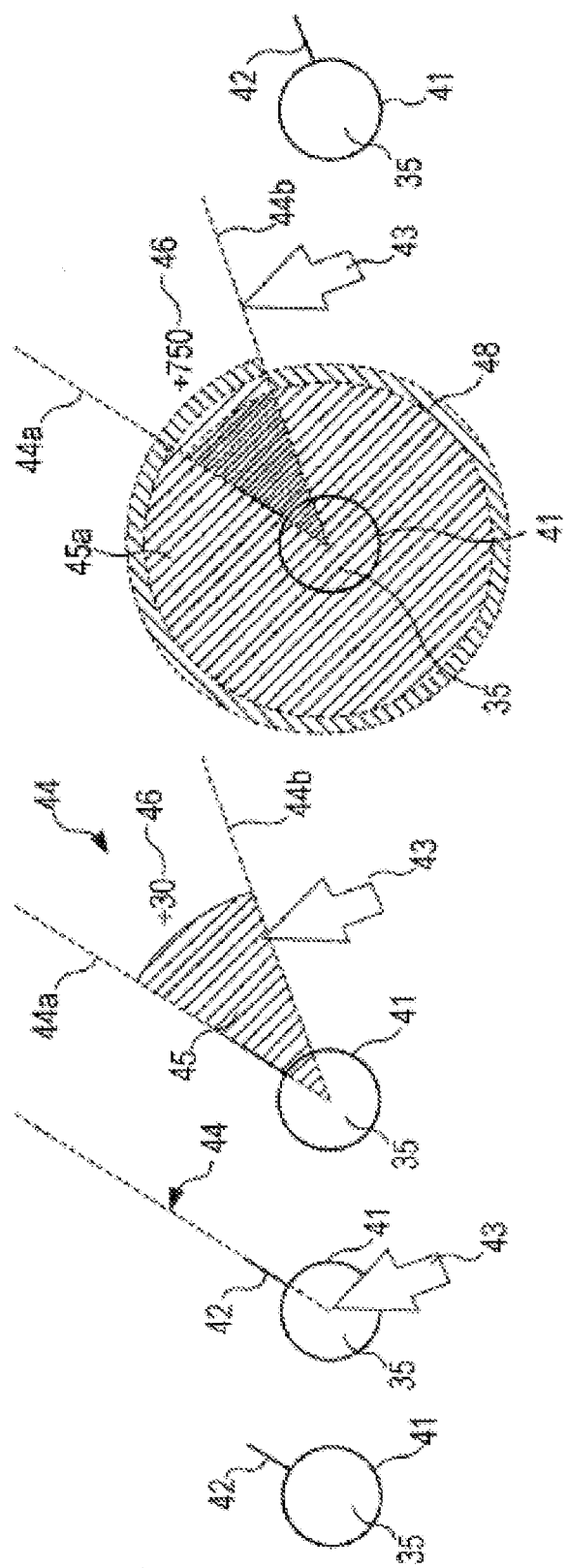
FIGS. 9A, 9B, 9C, 9D, and 9E show examples of the auxiliary indicator displayed in the method illustrated in FIG. 8.

<Parameter Adjusting Method>
FIG. 8 is a flowchart for illustrating the parameter adjusting method according to the third embodiment of the present invention. FIG. 9 shows examples of the auxiliary indicator displayed in the parameter adjusting method according to the third embodiment. Note that FIGS. 9A, 9B, 9C, 9D, and 9E show only one of the plurality of icons 35 in FIG. 3 in an enlarged manner. With reference to FIGS. 8 and 9A-E, the parameter adjusting method according to the third embodiment will be described. Processings in steps S1 to S3 and step S4 and the following steps are the same as those in the first embodiment, and thus, those steps are denoted by the same step numbers as those in FIG. 4, and descriptions thereof will be omitted.

In response to a drag manipulation of the mouse pointer 43 with the mouse 28, the CPU 21 alters the shape of the auxiliary indicator 44 into the shape of a sector centered on the icon 35 (step S3). Then, once the mouse pointer 43 dragged makes one full rotation about the icon 35, the auxiliary indicator 44 is displayed in the shape of a sector with a varying radius (step SB). More specifically, the auxiliary indicator 44 is first in the shape of a sector with a fixed radius and changes the shape while maintaining the radius (step S4), and then, once the mouse pointer 43 makes one full rotation as shown in FIG. 9D, the auxiliary indicator 44 is displayed in the shape of a sector with a varying radius centered on the icon 35 (step SB).

In this way, the CPU 21 monitors the movement of the mouse pointer 43 through the input I/F 27 and displays the line 44 $a$ of the auxiliary indicator that has been displayed as an extension of the marker 42 of the icon 35 since before the drag manipulation of the mouse pointer 43 as well as the line 44 $b$ that connects the tip of the mouse pointer 43 detected through the input I/F 27 and the center of the icon 35 and the auxiliary indicator area 45 in the shape of a sector with a fixed radius formed between the line 44 $a$ and the line 44 $b$ (step S3).

Then, as shown in FIG. 9D, after the tip of the mouse pointer 43 detected through the input I/F 27 makes one full rotation about the detection area 41, the CPU 21 continues to expand the auxiliary indicator 44 while varying the radius thereof into a sector with a varying radius so that the circumference of the auxiliary indicator 44 is not overlaid on the previous circumference thereof. Thus, the auxiliary indicator area 45 $a$ has the shape of a sector with a varying radius.

In addition, the CPU 21 displays a variation 46 of the auxiliary indicator area 45 in the vicinity of the auxiliary indicator area 45. In the example shown in FIG. 9D, the mouse pointer 43 is dragged to make more than two full rotations with respect to the marker 42 of the icon 35. The variation 46 indicates a value of +750, which means that the increment of the parameter with respect to the marker 42 of the icon 35 is +750.

When the processing in step SB is ended, as in the first embodiment, the CPU 21 performs the processings in step S4 and the following steps. The parameter adjusting method ends with the completion of the following processings. According to the parameter adjusting method according to this embodiment, even after the circumference of a sector with a fixed radius indicating the value of the parameter increases or decreases beyond a full circle, the value can continuously be indicated by the circumference of a sector with a varying radius, so that the ease of visual recognition of the auxiliary indicator by the user is improved, the value of the parameter can be more easily recognized, and the operability of parameter adjustment is improved.

Fourth Embodiment

With reference to FIGS. 10 and 11A-D, a parameter adjusting method according to a fourth embodiment of the present invention will be described. The parameter adjusting method according to the third embodiment can be implemented with the same hardware configuration as that of the parameter adjusting apparatus 10 according to the first embodiment. However, in the parameter adjusting method according to the fourth embodiment, a processing of step SC is performed instead of the processing of step S3 in the first embodiment. That is, the fourth embodiment differs from the first embodiment in that the auxiliary indicator is not displayed in the shape of a sector with a fixed radius but in the form of a slider.

<Parameter Adjusting Method>

Figure 10:
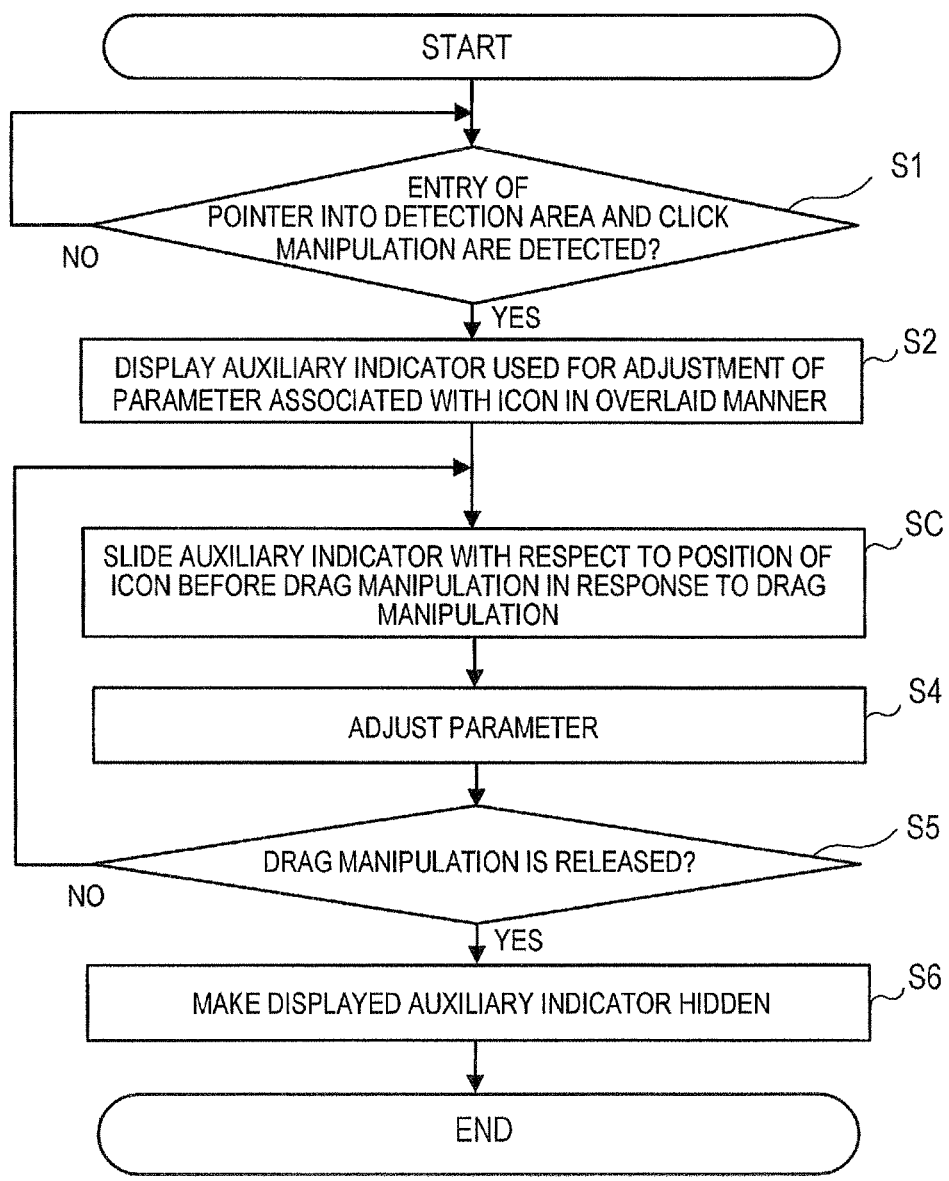
FIG. 10 is a flowchart for illustrating a parameter adjusting method according to a fourth embodiment of the present invention.

FIG. 10 is a flowchart for illustrating the parameter adjusting method according to the fourth embodiment of the present invention. FIGS. 11A, 11B, 11C, and 11D show examples of the auxiliary indicator displayed in the parameter adjusting method according to the fourth embodiment. The icons shown in FIGS. 11A, 11B, 11C, and 11D are not the icons in the form of a rotary dial shown in FIG. 3 but icons 38 (a sliding adjuster) in the form of a bar with a sharply-angled tip end that moves sideways on a ruler 52 in the shape of a straight line. With reference to FIGS. 10 and 11A-D, the parameter adjusting method according to the fourth embodiment will be described. Processings in steps S1 and S2 and step S4 and the following steps are the same as those in the first embodiment, and thus, those steps are denoted by the same step numbers as those in FIG. 4, and descriptions thereof will be omitted.

As shown in FIGS. 11A, 11B, 11C, and 11D, before a mouse pointer 53 enters the area of the icon 38 and a click manipulation occurs in a detection area 51 of the icon 38, an auxiliary indicator 54 is not displayed in the vicinity of the icon 38, and only the icon 38 and the ruler 52 guiding the icon are displayed. In the fourth embodiment, the value of the parameter associated with the icon 38 is indicated by the position of the icon 38 on the ruler 52. In this example, although not shown, an origin is located toward the left on the ruler 52. As the icon 38 moves to the left on the ruler 52, the value of the parameter decreases, and as the icon 38 moves to the right on the ruler 52, the value of the parameter increases.

The CPU 21 determines whether or not entry of the mouse pointer 53 into the detection area 51 of any of a plurality of icons 38 in response to a manipulation of the mouse 28 by the user and occurrence of a click manipulation are detected (step S1). More specifically, through the input I/F 27, the CPU 21 determines whether or not a click manipulation of the mouse pointer 53 occurs in the detection area 51 of any icon 38.

If the CPU 21 determines that no click manipulation of the mouse pointer 53 is detected in the detection area 51 of any icon 38, the CPU 21 stays in step S1 and waits until entry of the mouse pointer 53 into the detection area 51 of any icon 38 and occurrence of a click manipulation are detected.

On the other hand, if the CPU 21 determines that entry of the mouse pointer 53 into any detection area 51 in response to a manipulation of the mouse 28 by the user and occurrence of a click manipulation are detected, the auxiliary indicator used for adjustment of the parameter associated with the icon 38 is displayed (step S2). More specifically, the CPU 21 identifies the icon 38 clicked with the mouse pointer 53 through the input I/F 27 and displays the auxiliary indicator 54 shown in FIG. 11B on the screen by overlaying the auxiliary indicator 54 on the other contents displayed on the screen (overlay display). The auxiliary indicator 54 is displayed in the shape of a straight line that is perpendicular to the ruler 52 and passes through the tip of the icon 38 and is translucent enough that the information behind the auxiliary indicator in the edit window 40 can be seen.

Figure 11:
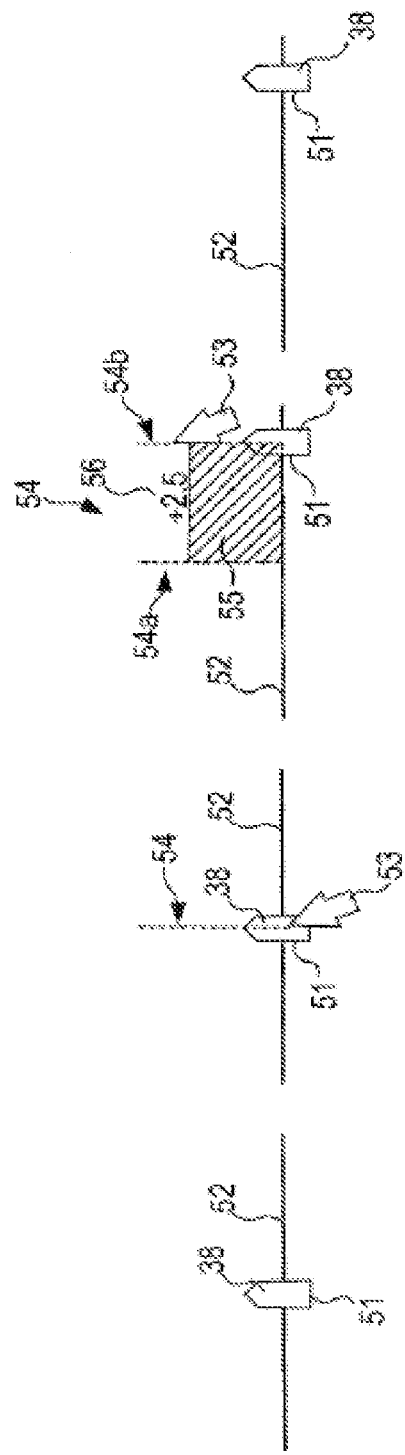
FIGS. 11A, 11B, 11C, and 11D show examples of the auxiliary indicator displayed in the method illustrated in FIG. 10.
Figure 12:
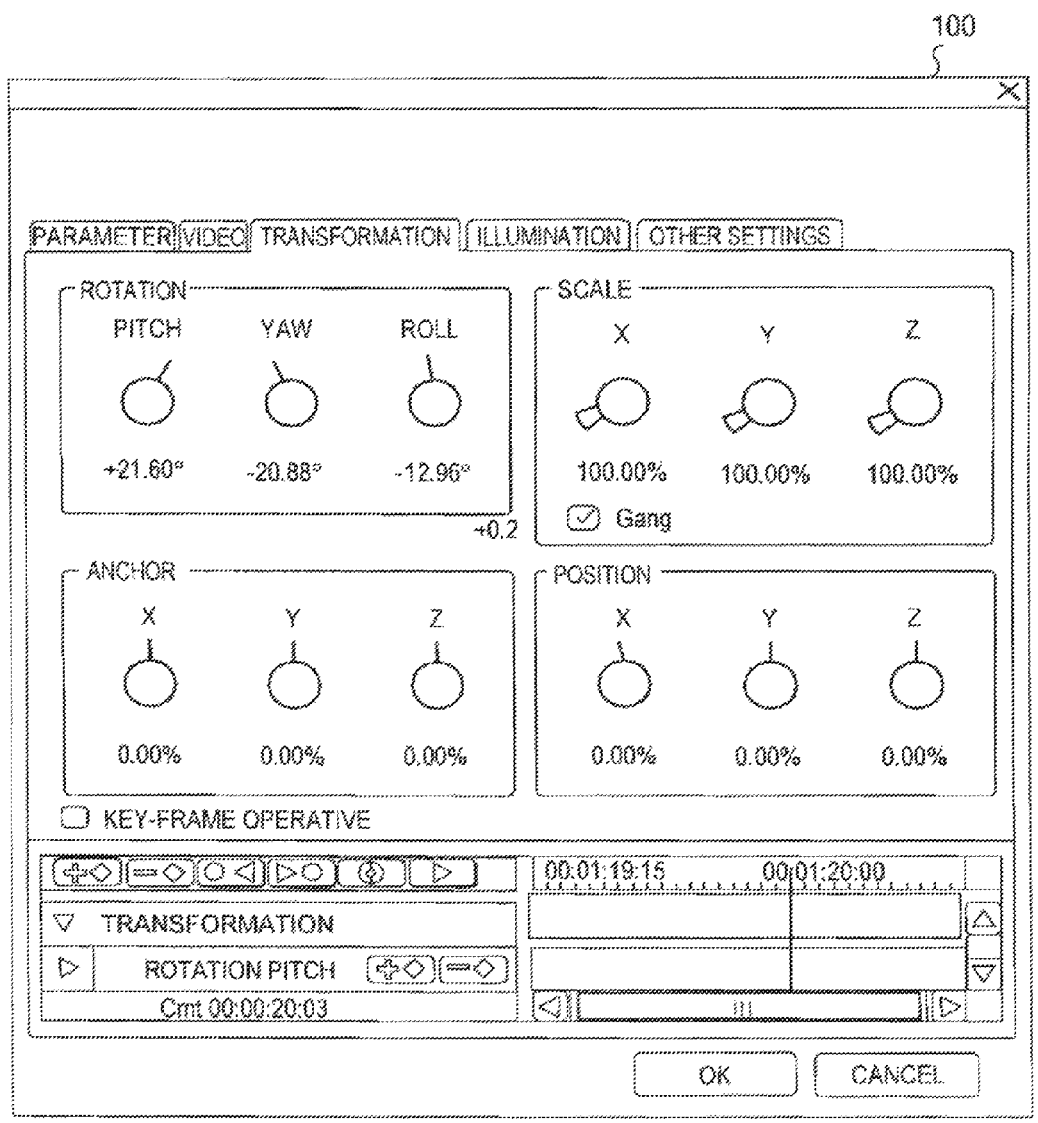
FIG. 12 shows a conventional user interface screen.

Then, in response to a drag manipulation of the mouse pointer 53 with the mouse 28, the CPU 21 makes the auxiliary indicator 54 slide with respect to the position thereof before the drag manipulation (step SC), as shown in FIG. 11C (step SC). In this step, the CPU 21 makes the auxiliary indicator 54 slide continuously from a reference line 54 $a$, which is the straight line that is perpendicular to the ruler 52 and passes through the tip end of the icon 38 before the drag manipulation of the mouse pointer 53, to a line 54 $b$ that is perpendicular to the ruler 52 and passes through the tip end of the moved mouse pointer 53 detected via the input I/F 27. In this way, as the auxiliary indicator 54, a rectangular auxiliary indicator area 55 having the reference line 54 *a* and the line 54 *b* as sides thereof is displayed.

Then, the CPU 21 adjusts the parameter in response to the drag manipulation of the mouse pointer 53 with the mouse 28 (step S4). In this step, the CPU 21 measures the distance between the reference line 54 *a* and the line 54 *b* as the increment or decrement of the parameter associated with the icon 38. Then, the parameter is adjusted by adding or subtracting the variation of the parameter corresponding to the measured distance as a parameter corresponding to the information about the content of the edition concerning the icon 38. The position of the tip end of the mouse pointer 53 moved by the drag manipulation is detected through the input I/F 27. The CPU 21 adjusts the parameter by adding or subtracting the increment or decrement of the parameter corresponding to the measured distance to or from the current value of the parameter as an increment or decrement of the parameter associated with the icon 38.

In addition, the CPU 21 displays a variation 56 depending on the auxiliary indicator area 55 in the vicinity of the auxiliary indicator area 55. In the example shown in FIG. 11C, the variation 46 indicates a value of +2.5, which means that the parameter associated with the icon 38 has increased by 2.5 points.

Then, the CPU 21 determines whether or not the drag manipulation of the mouse pointer 53 is released (step S5). More specifically, through the input I/F 27, the CPU 21 determines whether or not the drag manipulation of the mouse pointer 53 is released.

If the CPU 21 determines that the drag manipulation of the mouse pointer 53 is not released, the process returns to step SC, and the procedure from step SC to step S5 is repeated until the drag manipulation around the icon 38 is released. On the other hand, if the CPU 21 detects that the drag manipulation of the mouse pointer 53 is released, the CPU 21 makes the displayed auxiliary indicator 54 hidden as shown in FIG. 11D (step S6). The parameter adjusting methods ends with the completion of this step.

Although the step S4 of adjusting the parameter is performed after the step SC of altering the auxiliary indicator in this embodiment described above, the present invention is not limited thereto. Depending on the implementation, the step of altering the auxiliary indicator and the step of adjusting the parameter can be performed substantially simultaneously, or the step of adjusting the parameter can be performed before the step of altering the auxiliary indicator. Furthermore, although the auxiliary indicator is displayed when entry of the mouse pointer 53 into the detection area 51 of the icon 38 and occurrence of a click manipulation of the mouse pointer are detected in step S1 in this embodiment as described above, the present invention is not limited thereto. For example, the auxiliary indicator 54 may be displayed when the CPU 21 detects entry of the mouse pointer into the detection area 51 of the icon 38.

As described above, according to the present invention, even if a plurality of items each indicating predetermined information, such as icons, are displayed on the user interface screen, the user operability of adjustment of the parameter associated with the predetermined information is not compromised.

In the embodiments described above, the parameter adjusting apparatus 10 is applied to the non-linear editing apparatus. However, the present invention is not limited to the application. The present invention can be applied not only to the field of video edition, such as non-linear edition, but also to any type of user interface that allows manipulation of icons on a screen, such as a user interface for power control in a factory or power plant and a user interface for temperature control of a air conditioner. Furthermore, although the manipulating section for controlling the movement of the pointer is a mouse in the above description, any type of control device suitable for input of an instruction from the user, such as a keyboard and a joystick, can be used.

Although various parameter adjusting apparatuses according to different embodiments of the present invention have been described above, the parameter adjusting apparatus 10 according to the present invention can also be implemented by a program that makes a computer function as the sections described above. The program can be distributed over a communication line or via a recording medium, such as a CD-ROM.

Although different embodiments of the present invention have been described above, the present invention is not limited to the embodiments described above, and the embodiments described above can be combined with each other. For example, the second embodiment in which at least one of the recommended range and the non-recommended range is displayed as a part of the auxiliary indicator can be combined with the fourth embodiment. In addition, the effects of the embodiments of the present invention described above are the most preferable effects of the present invention described only for illustrative purposes, and the effects of the present invention are not limited to those described in the embodiments of the present invention.

The invention claimed is:

1. A parameter adjusting method, comprising:
   displaying on a screen a pointer manipulated according to a manipulation by a user and an icon manipulated with said pointer to adjust a parameter associated with the icon, wherein said icon comprises a marker, a location of said marker indicating current numerical information about said parameter associated with said icon;
   determining whether a predetermined manipulation of said icon with said pointer occurs;
   if it is determined that said predetermined manipulation of said icon with said pointer occurs, displaying an auxiliary indicator that indicates a current value of said parameter as an overlay associated with said icon in the vicinity of said icon on said screen, said auxiliary indicator being different than said icon and being used for adjustment of said parameter and comprising a marker extension that extends beyond said icon; and
   adjusting said parameter by manipulating said auxiliary indicator by manipulation of said pointer, wherein said auxiliary indicator is modified to display a numerical value for an increment or decrement of said parameter for said parameter associated with said icon in response to said manipulation.

2. The method according to claim 1, wherein in said determining, it is determined that the predetermined manipulation of said icon with said pointer occurs when said pointer enters a detection area of said icon.

3. The method according to claim 1, wherein in said determining, it is determined that the predetermined manipulation of said icon with said pointer occurs when said pointer enters a detection area of said icon and a click manipulation with a manipulating section occurs in the state where said pointer is located in said detection area.

4. The method according to claim 1, wherein said auxiliary indicator displayed on said screen is translucent enough that a content to be displayed behind said auxiliary indicator is visually recognizable.

5. The method according to claim 1, wherein said icon is in the form of a rotary dial that is rotated by manipulation of said pointer to adjust said parameter, and said auxiliary indicator has the shape of a sector with a fixed radius centered on said icon and extending beyond said icon.

6. The method according to claim 1, wherein said icon is in the form of a rotary dial that is rotated by manipulation of said pointer to adjust said parameter, and
said auxiliary indicator has the shape of a sector with a varying radius centered on said icon and extending beyond said icon.

7. The method according to claim 1, wherein said icon is in the form of a slider that is slid by manipulation of said pointer to adjust said parameter, and
said auxiliary indicator has a rectangular shape that extends in the direction of sliding of said icon.

8. The method according to claim 1, wherein said auxiliary indicator includes at least one of a recommended range and a non-recommended range of said parameter.

9. A computer program product comprising a non-transitory computer readable medium storing a parameter adjusting program, comprising code for:
determining whether or not, on a screen displaying a pointer manipulated according to a manipulation by a user and an icon manipulated with said pointer to adjust a parameter associated with said icon, a predetermined manipulation of said icon with said pointer occurs, wherein said icon comprises a marker, a location of said marker indicating current numerical information about said parameter associated with said icon;
displaying an auxiliary indicator that indicates a current value of said parameter as an overlay associated with said icon in the vicinity of said icon on said screen, if it is determined that the predetermined manipulation of said icon with said pointer occurs in said determining processing, said auxiliary indicator being different than said icon and being used for adjustment of said parameter and comprising a marker extension that extends beyond said icon; and
adjusting said parameter by manipulating said auxiliary indicator by manipulation of said pointer, wherein said auxiliary indicator is modified to display a numerical value for an increment or decrement of said parameter in response to said manipulation.

10. The computer program product of claim 9, wherein said auxiliary indicator includes at least one of a recommended range and a non-recommended range of said parameter.

11. The computer program product of claim 9, wherein it is determined that the predetermined manipulation of said icon with said pointer occurs when said pointer enters a detection area of said icon and a click manipulation with a manipulating section occurs in the state where said pointer is located in said detection area.

12. The computer program product of claim 9, wherein said auxiliary indicator displayed on said screen is translucent enough that a content to be displayed behind said auxiliary indicator is visually recognizable.

13. The computer program product of claim 9, wherein said icon is in the form of a rotary dial that is rotated by manipulation of said pointer to adjust said parameter, and said auxiliary indicator has the shape of a sector with a fixed radius centered on said icon and extending beyond said icon.

14. The computer program product of claim 9, wherein said icon is in the form of a rotary dial that is rotated by manipulation of said pointer to adjust said parameter, and
said auxiliary indicator has the shape of a sector with a varying radius centered on said icon and extending beyond said icon.

15. The computer program product of claim 9, wherein said icon is in the form of a slider that is slid by manipulation of said pointer to adjust said parameter, and
said auxiliary indicator has a rectangular shape that extends in the direction of sliding of said icon.

16. A parameter adjusting apparatus, comprising:
a determining section that determines whether or not, on a screen displaying a pointer manipulated according to a manipulation by a user and an icon manipulated with said pointer to adjust a parameter associated with said icon, a predetermined manipulation of said icon with said pointer occurs, wherein said icon comprises a marker, a location of said marker indicating current numerical information about said parameter associated with said icon;
an auxiliary indicator controlling section that, if said determining section determines that said predetermined manipulation of said icon with said pointer occurs, displays an auxiliary indicator that indicates a current value of said parameter as an overlay associated with said icon in the vicinity of said icon on said screen, said auxiliary indicator being different than said icon and being used for adjustment of said parameter and comprising a marker extension that extends beyond said icon; and
a parameter adjusting section that adjusts said parameter by manipulating said auxiliary indicator by manipulation of said pointer, wherein said auxiliary indicator is modified to display a numerical value for an increment or decrement of said parameter in response to said manipulation.

17. The apparatus according to claim 16, wherein the determining section determines that the predetermined manipulation of said icon with said pointer occurs when said pointer enters a detection area of said icon and a click manipulation with a manipulating section occurs in the state where said pointer is located in said detection area.

18. The apparatus according to claim 16, wherein the auxiliary indicator controlling section displays said auxiliary indicator on said screen to be translucent enough that a content to be displayed behind said auxiliary indicator is visually recognizable.

19. The apparatus according to claim 16, wherein the auxiliary indicator controlling section displays said auxiliary indicator to include at least one of a recommended range and a non-recommended range of said parameter.

20. The apparatus of claim 16, wherein said icon is in the form of a rotary dial that is rotated by manipulation of said pointer to adjust said parameter, and said auxiliary indicator has the shape of a sector with a fixed radius centered on said icon and extending beyond said icon.

* * * * *